US012783673B2

(12) United States Patent
Kasper et al.

(10) Patent No.: US 12,783,673 B2
(45) Date of Patent: Nov. 3, 2026

(54) WORKLOAD RECORDING AND REPLICATION TO FACILITATE SECURITY TESTING

(71) Applicant: INTERNATIONAL BUSINESS MACHINES CORPORATION, Armonk, NY (US)

(72) Inventors: Michael Page Kasper, Wappingers Falls, NY (US); Andrew C. M. Hicks, Highland, NY (US); Bryan Childs, Poughkeepsie, NY (US); Diane Marie Stamboni, Poughkeepsie, NY (US); Joshua David Steen, Fishkill, NY (US); Christopher V DeRobertis, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 18/524,004

(22) Filed: Nov. 30, 2023

(65) Prior Publication Data

US 2025/0181720 A1 Jun. 5, 2025

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC ........................... G06F 21/57; G06F 2221/034
See application file for complete search history.

(56) References Cited

U.S. PATENT DOCUMENTS

| | | | |
|---|---|---|---|
| 7,072,951 B2 | 7/2006 | Von Klopp | |
| 8,380,665 B2 | 2/2013 | Papadomanolakis | |
| 9,697,040 B2 | 7/2017 | Gottschlich | |
| 10,997,063 B1 | 5/2021 | Rai | |
| 11,093,371 B1 | 8/2021 | Hicks | |
| 11,294,804 B2 | 4/2022 | Hicks | |
| 11,636,028 B2 | 4/2023 | Hicks | |
| 2003/0145253 A1* | 7/2003 | de Bonet ............ | G06F 11/1438 714/38.13 |
| 2012/0221519 A1 | 8/2012 | Papadomanolakis et al. | |
| 2012/0311382 A1* | 12/2012 | Potkonjak ............. | G06F 11/165 714/E11.061 |

(Continued)

FOREIGN PATENT DOCUMENTS

| | | |
|---|---|---|
| CN | 102918508 B | 2/2016 |
| EP | 1952241 B1 | 3/2016 |
| WO | 2025/113913 A1 | 6/2025 |

OTHER PUBLICATIONS

International Searching Authority, "Notification of Transmittal of the International Search Report and the Written Opinion of the International Searching Authority, or Declaration," Patent Cooperation Treaty, Dec. 13, 2024, 14 pages, International Application No. PCT/EP2024/080566.

*Primary Examiner* — Zhe Liu
(74) *Attorney, Agent, or Firm* — Anthony Curro

(57) ABSTRACT

A computing device accesses a current workload. The computing device saves the current workload into a computer workload accessible format, the computer workload accessible format usable for replicating the current workload. Security testing may be performed using the computer workload accessible format.

19 Claims, 5 Drawing Sheets

(56) References Cited

U.S. PATENT DOCUMENTS

| | | | | |
|---|---|---|---|---|
| 2014/0282400 | A1* | 9/2014 | Moorthi | G06F 9/45558 717/122 |
| 2017/0060728 | A1* | 3/2017 | Younger | G06F 11/368 |
| 2018/0024916 | A1 | 1/2018 | Shazly et al. | |
| 2019/0087300 | A1 | 3/2019 | Bhimani et al. | |
| 2020/0104507 | A1* | 4/2020 | Kasper | G06F 21/577 |
| 2020/0301809 | A1* | 9/2020 | Mola | G06F 11/3461 |
| 2021/0382703 | A1* | 12/2021 | Kurtev | G06F 11/3688 |
| 2023/0021226 | A1* | 1/2023 | Bobrov | G06F 21/577 |
| 2023/0305947 | A1* | 9/2023 | Chibon | G06F 11/3684 |
| 2024/0143788 | A1* | 5/2024 | Chen | H04L 63/20 |
| 2024/0220636 | A1* | 7/2024 | Yi | G06F 21/57 |
| 2024/0232259 | A1* | 7/2024 | Wang | G06F 16/9014 |
| 2024/0362591 | A1* | 10/2024 | Bammi | G06Q 10/101 |

* cited by examiner

WORKLOAD RECORDING AND REPLICATION TO FACILITATE SECURITY TESTING

FIELD OF THE INVENTION

The present invention relates generally to computer security testing and more particularly to storage and recreation of workloads to facilitate security testing.

BACKGROUND

Presently disclosed embodiments relate to computer security testing. As computing systems and software in general continues to become more and more complicated, one mistake in a line of source code, one parameter call error, or the like can cause an entire computer system to become unstable or crash. The extreme complication of modern computing hardware and software makes testing of these issues either difficult or nearly impossible to obtain with any certainty. Despite complexity and difficulties, however, security testing remains an essential part of computer product lifecycles, since computer products must be extremely reliable and stable in order to be of value to the public at large. Security, stability, and system integrity are all essential in computing environments, despite the complexity of modern incarnations.

Thus, a need presents itself for a simple, streamlined, and automated manner for security testing of computing systems.

SUMMARY

Embodiments of the present invention disclose a method, system, and computer program product. In accordance with embodiments of the invention, a computing device accesses and records a current workload. The computing device saves the current workload into a computer workload accessible format, the computer workload accessible format usable for replicating the current workload.

In alternative aspect of the present invention, embodiments of the present invention disclose another method, system, and computer program product to utilize stored workloads in security testing. The computing device accesses and records a current workload. The computing device saves the current workload into a computer workload accessible format, the computer workload accessible format useable for replicating the current workload. The computing device receives a request for security testing. The computing device accesses the computer workload accessible format. The computing device loads the computer workload accessible format into a computing environment to recreate a previous workload. The computing device performs security testing on the previous workload.

In another alternative aspect of the present invention, embodiments of the present invention disclose another method, system, and computer program product to utilize stored workloads in security testing. The computing device accesses and records a current workload. The computing device accesses and records one or more environmental variables associated with the current workload. The computing device saves the current workload and the one or more environmental variables into a computer workload accessible format, the computer workload accessible format useable for replicating the current workload and the one or more environmental variables. The computing device receives a request for security testing. The computing device accesses the computer workload accessible format. The computing device modifies one or more environmental variables associated with the computer workload accessible format to generate a modified workload. The computing device deploys the modified workload. The computer device performs security testing on the modified workload.

DETAILED DESCRIPTION

Figure 1:
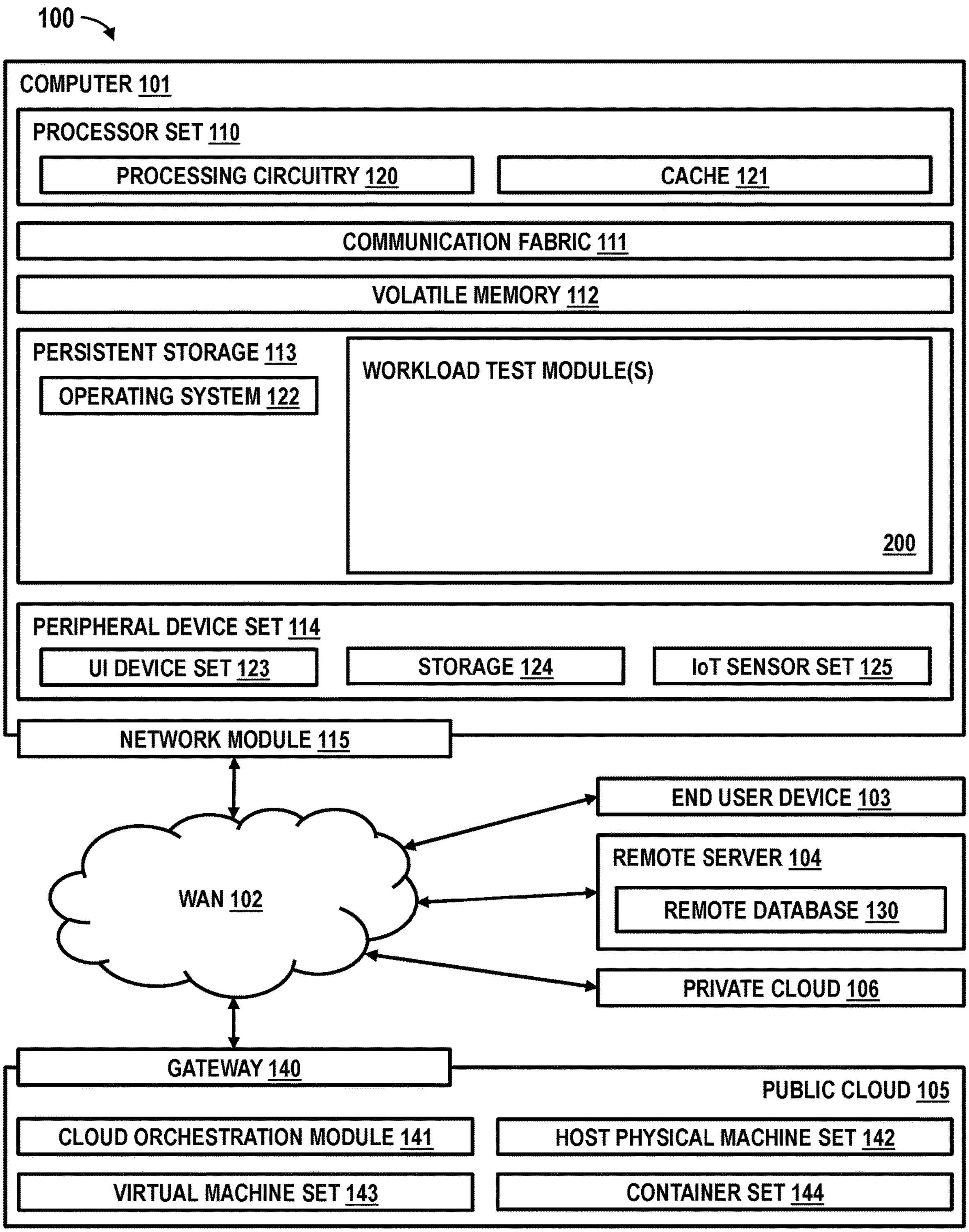
FIG. 1 represents a networked computer environment 100, in accordance with an embodiment of the present invention.

The presently disclosed embodiments relate to one or more methods, systems, and computer program products to utilize real-world computer workloads to facilitate security testing in computing environments. By automating or nearly automating workload testing of various computing systems, improved computer security, stability, and safety can be obtained in a speedy fashion. Testing of computer workloads may even occur outside of the computing environment itself, allowing the computing environment to continue executing while testing is performed, in order to provide uninterrupted services to continue. Embodiments of the invention present various advantages including the ability to access workloads in computing environments, store them, and later recreate workloads in order to facilitate testing, as well as provide other advantages disclosed herein. Presently disclosed embodiments however, may be implemented in different ways in various embodiments of the invention, including as a stand-alone application, as a part of the computer system being tested, or in any other way while being within the scope of the invention disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as associated with workload test module(s) 200. In addition to modules 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and modules 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processor set 110 may be alternatively be referred to herein as one or more "computing device(s)," but computing devices may also refer to one or more CPUs, microchips, integrated circuits, embedded systems, or the equivalent, presently existing or after-arising. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in modules 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in modules 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
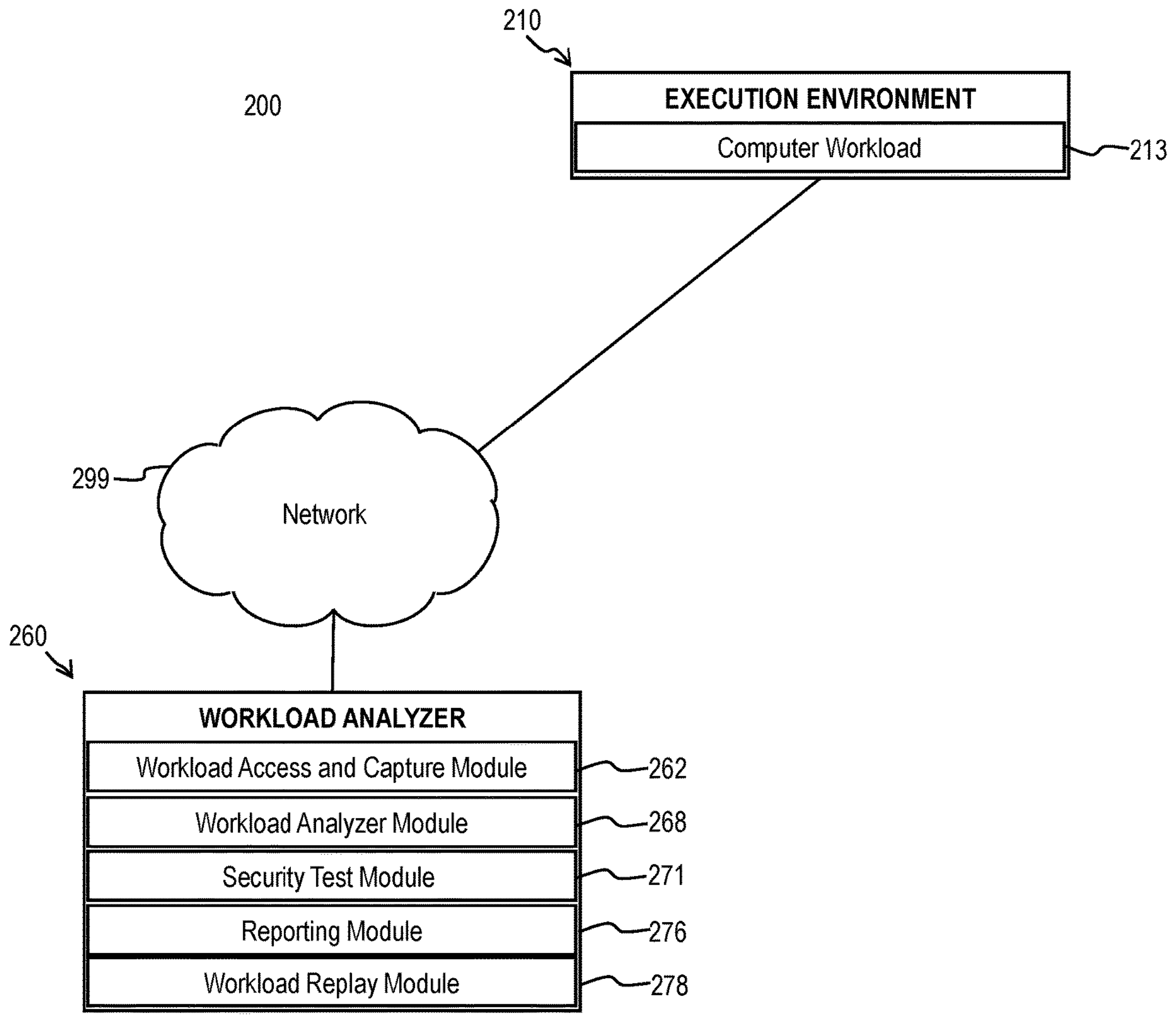
FIG. 2 is a functional block diagram illustrating workload test module(s) 200, in accordance with an embodiment of the present invention.

FIG. 2 is a functional block diagram illustrating workload test modules 200, in accordance with an embodiment of the present invention. In an embodiment of the invention, such as displayed in FIG. 2, execution environment 210 is operatively connected to workload analyzer 260 directly or via network 299. Execution environment 210, in various embodiments of the invention, may be any sort of computer hardware and associated software for execution of any sort of computer software/function, such as execution of a boot loader, log-in scripts, cloud server, execution of large-scale transaction processing, enterprise resource planning, execution of artificial intelligence software, etc. As would be understood of one of skill in the art, executing computer software (of various types discussed) by execution environment 210 may include various system calls, scripts, jobs, interface accesses, executable data, memory access, etc. and may requires calls to other source code modules, executable files, computer hardware, etc. in performing various functionality. Workload analyzer 260, as also displayed in FIG. 2, represents any sort of computer hardware and associated software for capture, replay, analysis, modification, error checking, security testing, and performance of other functionality discussed herein. Workload analyzer 260 generally, in an embodiment of the invention, utilizes stored workloads to perform security testing as described herein (with workload executing in execution environment 210).

As displayed in FIG. 2, in various embodiments of the invention, execution environment 210 and workload analyzer 260 are connected to and via network 299. In various embodiments of the invention, network 299 represents, for example, any sort of computer network such as a local area network (LAN), a wide area network (WAN) such as the Internet, and includes wired, wireless, or fiber optic connections. In various embodiments, network 299 is substantially the same as WAN 102, discussed in connection with FIG. 1 herein. In general, network 299 may be any combination of connections and protocols that will support communications between execution environment 210 and workload analyzer 260, in accordance with embodiments of the invention. In further embodiments of the invention, network 299 may represent an internal bus associated with a single or multi-core processor executing both execution environment 210 and workload analyzer 260 (such as in embodiments where execution environment 210 and workload analyzer 260 are integrated).

Discussing elements displayed in FIG. 2 in further detail, execution environment 210 represents computer hardware and/or software executing a workload. Execution environment 210 may contain one or more computer processor(s), (including register(s), cache, etc.), logic circuits, computer memory, secondary storage, etc., as well associated firmware, software etc. which allows execution of "workloads." Any sort of execution environment 210 is contemplated within embodiments of the invention disclosed herein, and make take advantages of aspects of the invention. A "workload," as discussed herein, refers to any sort of executing computer program application, database access, logical operation, boot sequence, etc., or any other software executing in execution environment 210. The workload executing by execution environment 210 may be, by non-limiting example, a boot loader, log-in scripts, a cloud server, large scale transaction processing, enterprise resource planning, artificial intelligence software, etc. In embodiments of the invention, execution environment 210 may require security testing, to assure a stable computing environment is present for use in a professional capacity. Certain regulatory or legal requirements, may even require security testing within certain applications. In other embodiments of the invention, workload executing in execution environment 210 may be saved for other utilizations.

In various embodiments, as discussed previously, execution environment 210 includes computer workload 213.

Computer workload 213, in embodiments of the invention, is executed by execution environment 210 (as further discussed herein). Computer workload 213 may include, by non-limiting example, a boot loader, log-in scripts, cloud server, performance of large-scale transaction processing, enterprise resource planning, execution of artificial intelligence software, etc., or any other type of executing software (as discussed further herein). As one of skill in the art understands, the software associated with computer workload 213 may include uncompiled/compiled/interpreted source code, bytecode, and/or other types of computer software, database accesses, etc. Environmental variables set independently within computer workload 213 and/or elsewhere within execution environment 210 may also be included in computer workload 213. In embodiments of the invention, computer workload 213 may also contain one or more of input parameters, scripts, jobs, executable data, traces, records, and/or other items. Embodiments of the invention may present the advantage of storing all such information. Other elements may be alternatively or additionally included as well. Computer workload 213, in various embodiments of the invention, may refer to a "current workload" executing in execution environment 210, but as further discussed in connection with workload analyzer 260 when stored and re-created by workload analyzer 260 may also be considered a "previous workload" (as discussed further herein), which may be utilized in various ways as discussed herein.

Continuing with regard to FIG. 2, workload analyzer 260 represents, in various embodiments of the invention, software and/or hardware for accessing, storing, re-creating, and storing a workload(s) executing within execution environment 210, as well as performing security testing on the workload (and, in embodiments of the invention, performing other functions as disclosed herein). As discussed, security testing is a necessary aspect of computer software and hardware releases. Although the complexity of computer software and hardware continues to grow, human abilities to comprehend and error test the sheer volume of modern software/hardware is limited. Presently disclosed embodiments present the advantage of automating significant portions of security testing. In various embodiments of the invention, workload analyzer 260 includes one or more of workload access and capture module 262, workload analyzer module 268, security test module 271, reporting module 276, and workload replay module 278.

Workload access and capture module 262 represents software and/or hardware for accessing and recording a current workload in execution environment 210. Upon request, pursuant to schedule (or initiated in another way), workload access and capture module 262 accesses and records a current workload executing in execution environment 210. Access and recording of the current workload may be performed in various ways, in embodiments of the invention, such as via an authorized computer interface associated with execution environment 210 monitoring code being access/executed, via monitoring of executing assembly instructions executing in execution environment 210, or in another, equivalent way. In an embodiment of the invention, workload access and capture module 262 also accesses and records one or more environmental variables associated with the computer workload and execution environment 210. Environmental variables may affect all processes executing within execution environment 210 (not only the current workload). Knowledge of these is useful in security testing since they may have a large effect on software executing in execution environment 210. After access and storage such as discussed, workload access and capture module 262 saves the current workload and, optionally, the one or more environmental variables into a computer workload accessible format usable for replicating the current workload (and, in various embodiments, the one or more environmental variables). The currently workload accessible format is maintained/saved/stored by workload access and capture module 262 for future usage. The computer workload accessible format may be any sort of computer file, image, or the like allowing the workload to be recreated at a later time (such as a computer image, other software, bytecode, assembly instructions, etc.). As further discussed herein, the current image saved by workload access and capture module 262 is useful for security testing. In an embodiment of the invention, the computer workload accessible format is saved into a commonly accessible format which may be utilized to recreate workloads in other computing devices (such as workload analyzer 260, or other computing devices not displayed here). In a further embodiment of the invention, the computer workload accessible format is associated with a map to a list of parameters stored by the computer accessible workload. This presents advantages in determining utilizations of various parameters when computer workloads are analyzed.

Workload analyzer module 268 represents software and/or hardware for analyzing stored workloads accessed and recorded by workload access and capture module 262. Workload analyzer module 268 analyzes workloads in various ways, in embodiments of the invention, with the analysis used for various purposes as discussed herein, but especially in security testing. In an embodiment of the invention, workload analyzer module 268 identifies in the current workload calls to authorized interfaces and a format of various parameters used to call the authorized interfaces. This presents the advantage in security testing, for example, of having knowledge of which interfaces are called in workloads, and also how they are called. When performing security testing, interface calls in workloads may be highly useful in determining potential sources of errors and other inconsistencies, for example. Interface knowledge as described may be used, in various embodiments of the invention, also in generally analyzing workloads. In a further embodiment of the invention, workload analyzer module 268 stores one or more parameter list maps indicating one or more locations in the current workload where parameters are called, and a function of the parameters. The presents the advantage in security testing of identifying potential locations in the current workload which may be associated with one or more errors and specifically what is causing the errors. It also provides general information regarding the current workload which may be utilized to generally analyze workloads. Workload analyzer module 268 may also identify one or more potential modifications to the one or more parameter list maps, the modifications changing calling of parameters within the parameter list maps. The potential modifications may be used, for example, to facilitate security testing, providing advantages where, for example, the one or more potential modifications are associated with possible solutions to solve noted security issues. Different modifications may be automatically tried until a solution for a potential security issue is found.

Security test module 271 represents software and/or hardware for performance of security testing on workloads accessed and captured by workload access and capture module 262. In an embodiment of the invention, in order to initiate security testing a request is received to initiate the testing. The request to initiate security testing may be initiated by a developer specifically requesting testing or, security testing may be automatically initiated pursuant to a new software rollout on execution environment 210, or it may be initiated in any other way. Other scheduling or conditions for automatic commencement of security testing by security test module 271 are contemplated herein. Once security testing begins, security test module 271 accesses from workload access and capture module 268 the computer workload accessible format. Security test module 271 then loads the computer workload accessible format into a local or remote computing environment to recreate the previous workload associated with the computer workload accessible format. After loading of the previous workload, security test module 271 then performs security testing on it. Performance of testing on the previous workload associated with the computer workload accessible format presents advantages, as discussed herein. It allows for accurate security testing to be performed without upsetting software presently executing on execution environment 210 (such as, for example, executions of thousands of financial transactions 24-7 on execution environment 210). It also allows security testing to be performed in a sandboxed environment, not allowing program failure to occur in execution environment 210, as well as presenting other advantages.

In various embodiments of the invention, security testing performed by security test module 271 on the previous workload is performed in different ways. In an embodiment of the invention, when performing security testing, workload analyzer security test module 271 modifies one or more parameters in service calls within the previous workload to generate a modified previous workload, and security testing is performed on the modified previous workload. This presents the advantages of sandboxed testing (while execution may continue proceeding on execution environment 210), as well as a variety of different approaches to improving system security. In a further embodiment of the invention, workload analyzer security test module 271 modifies one or more parameters in the service calls within the previous workload to generate a modified previous workload, and executes the modified workload to generate one or more errors, then analyzes the errors. This presents the advantage of allowing workload analyzer 260 to make various modifications to the previous workload to determine which types of errors may be caused, and thereby learn to correct the errors (thus providing for improved security, stability, etc. in execution environment 210). The errors may be, in various embodiments of the invention, runtime errors, compilation errors, memory access errors, etc. In a further embodiment of the invention, after analyzing the errors, workload analyzer 260 combines parameters in service calls or spaces out in time parameters within service calls to limit a scope of the one or more errors. This presents the general advantage of limiting errors in workloads (leading to, for example, improved system security), in the specific manner discussed, specifically changing service calls or spacing out in time parameters within service calls. In another embodiment of the invention, security test module 271, after loading the computer workload accessible format, modifies one or more environmental variables within the computer workload accessible format to generate a modified previous workload, and preforms security testing on the modified previous workload. This provides the advantage of testing of different environmental variables in the modified workloads, and determining whether the changes lead to, for example, a more stable environment or a less stable environment, as well as providing other advantages. Security test module 271, after generating the modified previous workload (or in connection with other embodiments herein) may analyze one or more program checks arising from security testing. Program checks occur in the context of execution of software by execution environment 210, when execution environment 210 and/or workload analyzer 260 detects programming errors. Program checks may be associated with an "abend," or an abnormal termination in software executing in execution environment 210 and/or workload analyzer 260. Analyzation of program checks arising from security testing may provide more details regarding potential errors to be avoided. This presents the advantage of more detailed information in security testing, particularly towards potential errors which may be generated or corrected.

Reporting module 276 represents software and/or hardware for reporting of one or more security vulnerabilities, errors, abends, program checks, and/or other security issues detected by workload analyzer 260 in connection with embodiments of the invention disclosed herein. In order to best utilize information from workload analyzer 260 regarding programs executing in execution environment 210, information regarding potential errors, abends, program checks, security issues, may be reported to one or more users who can take remediation action to address these issues. Reporting module 275 may provide such reports in a computer interface, regularly scheduled e-mail, etc., with the goal of providing useful information to various sorts of users (such as developers, project managers, etc.).

Workload replay module 278 represents software and/or hardware for replaying of stored workloads from execution environment 210. In embodiments of the invention where present, workload replay module 278 may access computer workload accessible formats stored by workload access and capture module and utilize the computer workload accessible formats to load the associated computer workloads, as well as replay the workloads, etc. (without necessarily performing security testing on the workload) This may present developers, project, managers, etc. with abilities to review the workloads in further depth, make custom edits, roll out different versions, etc.

Figure 3:
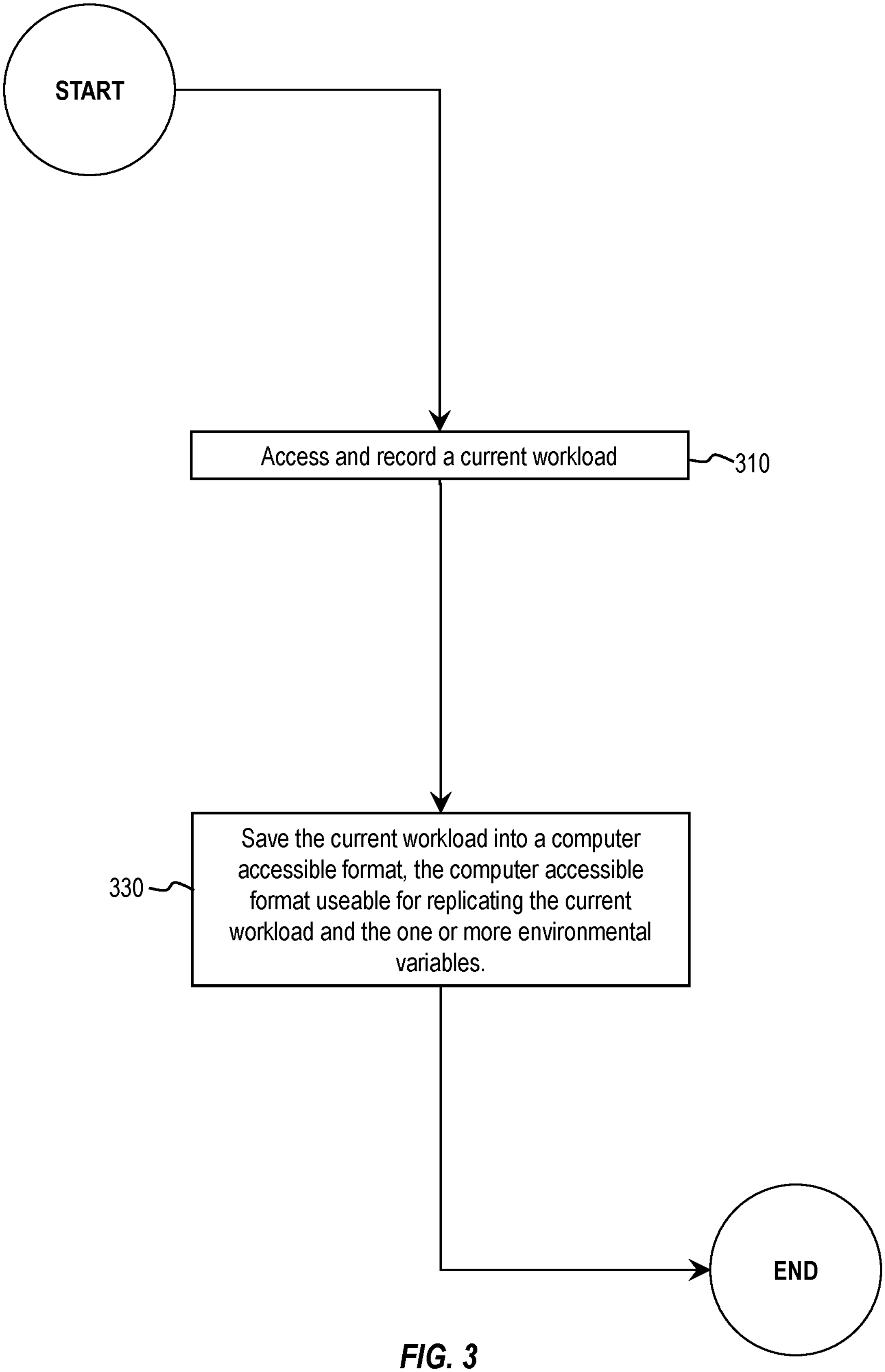
FIG. 3 is a flowchart 300 depicting operational steps that a hardware component of a hardware appliance may execute, in accordance with an embodiment of the present invention.

FIG. 3 is a flowchart depicting operational steps that a hardware component, multiple hardware components, and/or a hardware appliance may execute, in accordance with an embodiment of the invention. As shown in FIG. 3, at step 310 workload analyzer 260 accesses and records a current workload executing in execution environment 210. At step 330, workload analyzer 260 saves the current workload into a computer accessible format, the computer accessible format usable for replicating the current workload. An embodiment such as presented in connection with FIG. 3 presents the advantage of independently storing a current workload in a computer accessible format which may be utilized to recreate the current workload while the current workload proceeds, or at a later time. This presents a variety of advantages: for example, if one desires to later reproduce a previous workload because a certain build of software was more stable than a later version, embodiments of the invention can be used to recreate the previous workload. Advantages are particularly presented in security testing of workloads. By allowing security testing to proceed in an independent computer environment, a variety of different types of security testing may be attempted on the same workload, and it may be determined which technique provides the best results (which can be rolled out at a later time). By workload analyzer 260 operating independently from execution environment 210, execution environment 210 may continue to operate normally while testing (or other functionality) is independently performed.

Figure 4:
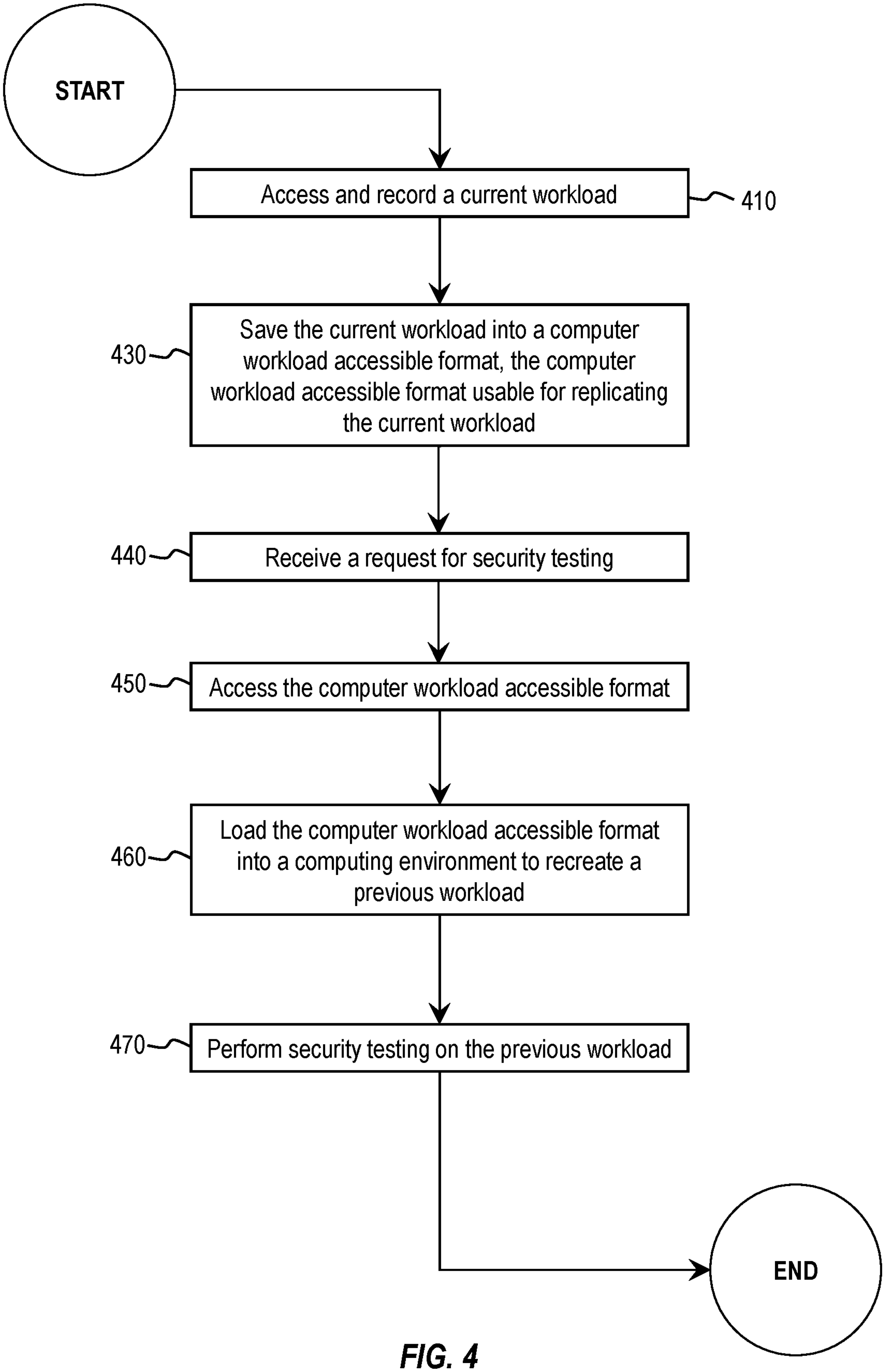
FIG. 4 is a flowchart 400 depicting operational steps that a hardware component of a hardware appliance may execute, in accordance with an alternative embodiment of the invention.

FIG. 4 is a flowchart depicting alternative operational steps that a hardware component, multiple hardware components, and/or a hardware appliance may execute, in accordance with an embodiment of the invention. As shown in FIG. 4, at step 410 workload analyzer 260 accesses and records a current workload executing in execution environment 210. At step 430, workload analyzer 260 saves the current workload into a computer accessible format, the computer accessible format usable for replicating the current workload. At step 440, workload analyzer 260 receives a request for security testing. At step 450, workload analyzer 260 accesses the computer workload accessible format. At step 460, workload analyzer 260 loads the computer workload accessible format into a computing environment to recreate a previous workload. At step 470, workload analyzer 260 performs security testing on the previous workload. An embodiment such as displayed in connection with FIG. 4 presents the advantage of providing an independent computing environment for testing of a current workload executing in execution environment 210. The independent computing environment for security testing of the workload then executing in execution environment 210 provides for sandboxed security testing while allowing the execution to proceed in execution environment 210. Security advantages thus result, while allowing execution to proceed normally in execution environment 210. If changes need to be made to improve security of execution environment 210, they can be later made during a planned downtime.

Figure 5:
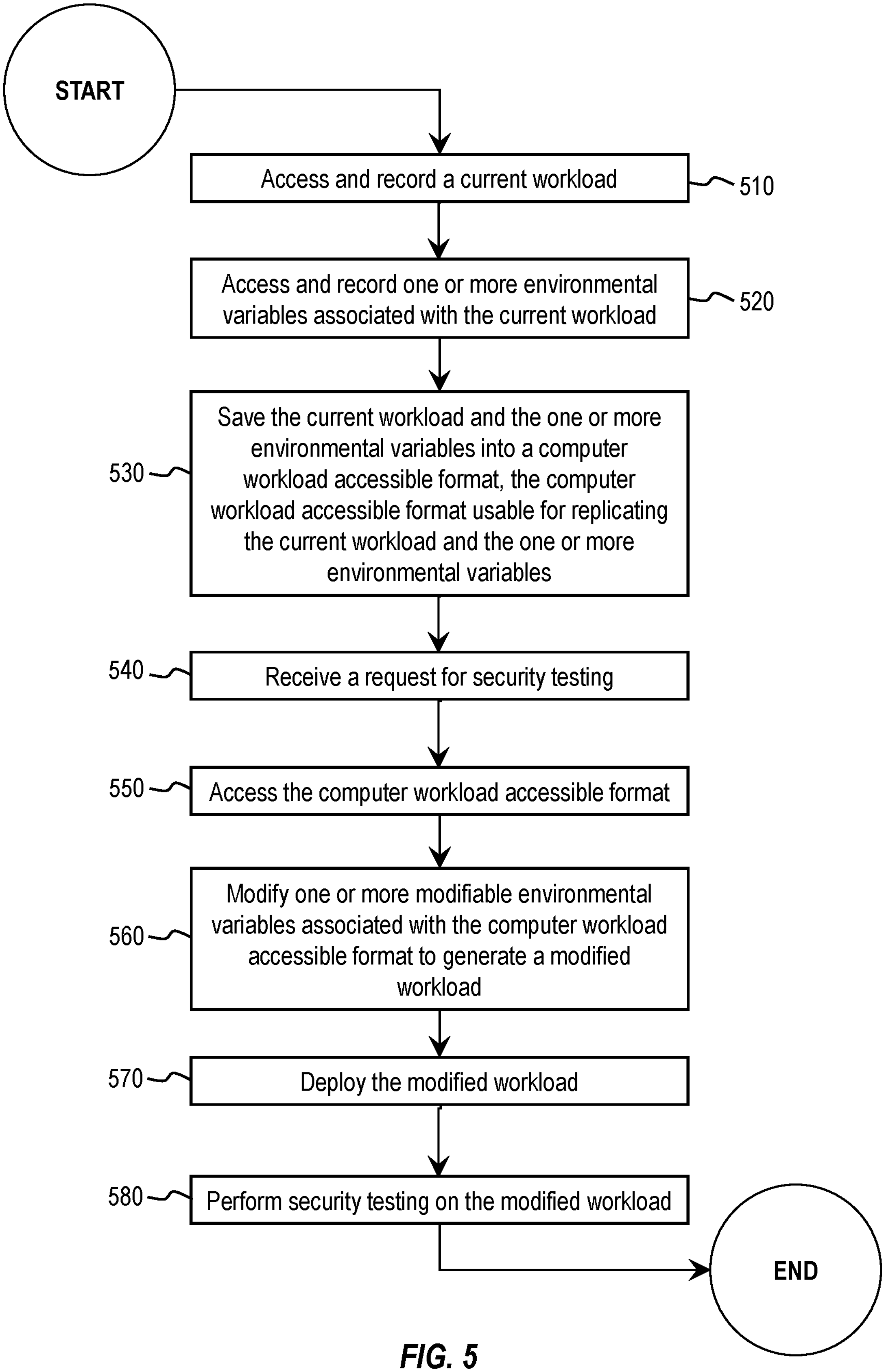
FIG. 5 is a flowchart 500 depicting operational steps that a hardware component of a hardware appliance may execute, in accordance with another alternative embodiment of the invention.

FIG. 5 is a flowchart depicting further alternative operational steps that a hardware component, multiple hardware components, and/or a hardware appliance may execute, in accordance with an embodiment of the invention. As shown in FIG. 5, at step 510 workload analyzer 260 accesses and records a current workload executing in execution environment 210. At step 520, workload analyzer 260 accesses and records one or more environment variables associated with the current workload in execution environment 210. At step 530, workload analyzer 260 saves the current workload and the one or more environmental variables into a computer accessible format, the computer accessible format usable for replicating the current workload and the one or more environmental variables. At step 540, workload analyzer 260 receives a request for security testing. At step 550, workload analyzer 260 accesses the computer workload accessible format. At step 560, workload analyzer 260 modifies one or more modifiable environmental variables associated with the computer workload accessible format to generate a modified workload. At step 570, workload analyzer 260 deploys the modified workload. At step 580, workload analyzer 260 performs security testing on the modified workload. An embodiment such as displayed in connection with FIG. 5 presents the advantage of providing an independent computing environment for modification and testing of a workload executing in execution environment 210. This provides for making of incremental changes to modifiable environmental variables in the stored computer workload accessible format, and performance of security testing on the thus modified workloads. Performance of independent security testing by workload analyzer 260 on the modified workload provides for a user to determine, for example, which modifications to environmental variables lead to an environment which is more stable and which is less stable.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method using a computing device to perform security testing of computer workloads while allowing a computing environment hosting the computer workloads to continue executing, the method comprising:

accessing and recording by the computing device a current workload, the current workload being executed within the computing environment;

saving by the computing device the current workload and one or more parameters associated with the current workload into a computer workload accessible format, the computer workload accessible format useable for replicating the current workload;

loading by the computing device the computer workload accessible format to replicate a previous workload to perform sandboxed security testing on the previous workload while the current workload continues to execute;

modifying by the computing device one or more parameters in service calls within the previous workload to generate a modified previous workload;

executing by the computing device the modified previous workload with the one or more modified parameters in service calls to generate one or more errors;

performing by the computing device security testing on the modified previous workload by analyzing the one or more errors, the security testing on the modified previous workload proceeding while the current workload continues being executed within the computing environment;

determining which types of errors have occurred have been caused, the errors including selectively one or more of runtime errors, compilation errors, and memory access errors; and reporting by the computing device one or more errors to one or more users for remediation.

2. The method of claim 1, further comprising identifying in the current workload calls to authorized interfaces and a format of parameters used to call the authorized interfaces.

3. The method of claim 1, further comprising storing one or more parameter list maps indicating one or more locations in the current workload where parameters are called and a function of the parameters.

4. The method of claim 3, further comprising identifying one or more potential modifications to the one or more parameter list maps, the modifications changing calling of parameters within the parameter list maps.

5. The method of claim 1, further comprising after analyzing the errors combining parameters in service calls or spacing out in time parameters within service calls to limit a scope of the one or more errors.

6. The method of claim 1, wherein the current workload includes one or more environmental variables.

7. The method of claim 6, further comprising modifying the one or more environmental variables within the computer workload accessible format when generating the modified previous workload and performing the security testing on the modified previous workload.

8. The method of claim 7, further comprising analyzing one or more program checks arising from security testing.

9. The method of claim 1, further comprising reporting one or more security vulnerabilities discovered by security testing.

10. The method of claim 1, wherein the current workload includes selectively one or more of one or more environmental variables, executable binaries, user identities, input parameters, scripts, jobs, executable data, traces, records, events, timing, input, and output.

11. The method of claim 1, wherein the computer workload accessible format is saved into a commonly accessible format.

12. The method of claim 1, wherein the computer workload accessible format is associated with a map to a list of parameters stored by the computer accessible workload.

13. A method using a computing device to perform security testing of computer workloads while allowing a computing environment hosting the computer workloads to continue executing, the method comprising:

accessing and recording by the computing device a current workload, the current workload being executed within the computing environment;

saving by the computing device the current workload and one or more parameters associated with the current workload into a computer workload accessible format, the computer workload accessible format useable for replicating the current workload;

receiving by the computing device a request for security testing;

accessing by the computing device the computer workload accessible format;

loading by computing device the computer workload accessible format into a computing environment to recreate a previous workload to perform sandboxed testing on the previous workload while the current workload continues to execute;

modifying by the computing device one or more parameters within the previous workload to generate a modified previous workload;

executing by the computing device the modified previous workload with the one or more modified parameters in service calls to generate one or more errors;

performing by the computing device security testing on the modified previous workload by analyzing the one or more errors, the security testing on the modified previous workload proceeding while the current workload continues being executed with the computing environment;

determining which types of errors have occurred have been caused, the errors including selectively one or more of runtime errors, compilation errors, and memory access errors; and reporting by the computing device one or more errors to one or more users for remediation.

14. The method of claim 13, wherein the current workload includes selectively one or more of one or more environmental variables, executable binaries, user identities, input parameters, scripts, jobs, executable data, traces, records, events, timing, input, and output.

15. A computer program product to perform security testing of computer workloads while allowing a computing environment hosting the computer workloads to continue executing, the computer program product comprising:

one or more non-transitory computer-readable storage media and program instructions stored on the one or more non-transitory computer-readable storage media capable of performing a method, the method comprising:

accessing and recording by the computing device a current workload, the current workload being executed within the computing environment;

saving by the computing device the current workload and one or more parameters associated with the current workload into a computer workload accessible format, the computer workload accessible format useable for replicating the current workload;

receiving by the computing device a request for security testing;

accessing by the computing device the computer workload accessible format;

loading by the computing device the computer workload accessible format into a computing environment to recreate a previous workload to perform sandboxed security testing on the previous workload while the current workload continues to execute;

modifying by the computing device one or more parameters within the previous workload to generate a modified previous workload;

executing by the computing device the modified previous workload with the one or more modified parameters in service calls to generate one or more errors;

performing by the computing device security testing on the modified previous workload by analyzing the one or more errors, the security testing on the modified previous workload proceeding while the current workload continues being executed with the computing environment;

determining which types of errors have occurred have been caused, the errors including selectively one or more of runtime errors, compilation errors, and memory access errors; and reporting by the computing device one or more errors to one or more users for remediation.

16. The computer program product of claim 15, further comprising analyzing one or more program checks arising from security testing.

17. A computer system comprising:

a processor set;

one or more computer-readable storage media; and program instructions stored on the one or more computer-readable storage media to cause the processor set to perform operations comprising:

accessing and recording by the computing device a current workload, the current workload being executed within a computing environment;

saving by the computing device the current workload and one or more parameters associated with the current workload into a computer workload accessible format, the computer workload accessible format useable for replicating the current workload;

loading by the computing device the computer workload accessible format to replicate a previous workload to perform sandboxed security testing on the previous workload while the current workload continues to execute;

modifying by the computing device one or more parameters in service calls within the previous workload to generate a modified previous workload;

executing by the computing device the modified previous workload with the one or more modified parameters in service calls to generate one or more errors;

performing by the computing device security testing on the modified previous workload by analyzing the one or more errors, the security testing on the modified previous workload proceeding while the current workload continues being executed within the computing environment;

determining which types of errors have occurred have been caused, the errors including selectively one or more of runtime errors, compilation errors, and memory access errors; and reporting by the computing device one or more errors to one or more users for remediation.

18. The computer system of claim 17, further wherein the operations further comprise analyzing one or more program checks arising from security testing.

19. The computer system of claim 17, wherein the workload includes selectively one or more of one or more environmental variables, executable binaries, user identities, input parameters, scripts, jobs, executable data, traces, records, events, timing, input, and output.

* * * * *